United States Patent [19]
Suhara

[11] Patent Number: 5,183,019
[45] Date of Patent: Feb. 2, 1993

[54] IDLING CONTROL DEVICE FOR HIGH PRESSURE FUEL INJECTION ENGINE

[75] Inventor: Hidenori Suhara, Iwata, Japan

[73] Assignee: Yamaha Hatsudoki Kabushiki Kaisha, Iwata, Japan

[21] Appl. No.: 725,552

[22] Filed: Jul. 3, 1991

[30] Foreign Application Priority Data

Jul. 5, 1990 [JP] Japan .................................. 2-178896

[51] Int. Cl.$^5$ .............................................. F02D 41/16
[52] U.S. Cl. ..................................... 123/339; 123/447
[58] Field of Search ................................ 123/339, 447

[56] References Cited
U.S. PATENT DOCUMENTS 4,161,161 7/1979 Bastenhof ............................ 123/447
4,367,709 1/1983 Codrington ......................... 123/339
4,841,936 6/1989 Takahashi ........................... 123/447

FOREIGN PATENT DOCUMENTS

63-117141 5/1988 Japan .................................. 123/339

Primary Examiner—Andrew M. Dolinar
Attorney, Agent, or Firm—Ernest A. Beutler

[57] ABSTRACT

A high pressure fuel injection control system for maintaining idle speed of an injected high speed diesel engine. Idle speed is maintained by holding either pressure supplied to the injector constant and varying the duration of timing or holding the duration of timing constant and varying the pressure depending upon the desired running condition to achieve the desired engine performance.

14 Claims, 5 Drawing Sheets

IDLING CONTROL DEVICE FOR HIGH PRESSURE FUEL INJECTION ENGINE

BACKGROUND OF THE INVENTION

This invention relates to an idling control device for a high pressure fuel injection diesel engine and more particularly to an improved apparatus and method for controlling the idle condition in such engines.

As is well known, the typical diesel engine employs direct cylinder fuel injection. In conjunction with conventional diesel engines, the fuel injected at idle is injected for a relatively short duration, such as approximately 10° of crank angle, and the ignition system must be set at a very early period for appropriate running of the engine. As a result, knocking increases. If, on the other hand, injection is delayed to avoid knocking, then poor combustion efficiency may result.

If the duration of fuel injection can be extended, then it is possible to overcome the aforenoted problems. This can be fuel injection nozzle. When an accumulator type fuel injection nozzle is employed, then the injection duration, even at idle, can be extended. For example, it is possible to start fuel injection at approximately 10° before top dead center and terminate it as much as 30° after top dead center. This can give rise to much improved combustion conditions and reduced knocking and improved combustion efficiency. However, it has been found that the manner in which the idle speed is controlled can be very critical on the engine performance.

It is, therefore, a principal object of this invention to provide an improved idling control device for high pressure fuel injection diesel engines and a method for operating such a device.

It is a further object of this invention to provide an idle injection control for a fuel injected diesel internal combustion engine wherein the idle speed can be controlled by selected strategies to improve the idle condition of the engine.

SUMMARY OF THE INVENTION

This invention is adapted to be embodied in a high pressure fuel injection system for a diesel internal combustion engine comprising an accumulator type fuel injector for spraying fuel into the engine. Pressure control means control the pressure of the fuel supplied to the fuel injector and duration control means control the timing of the discharge of the injector. Means are provided for sensing engine speed and other means are provided for sensing when an idle condition is called for by the engine. In accordance with the invention, a predetermined idle speed is maintained by holding one of the pressure control means and the duration control means constant and varying the other of the control means.

Another feature of the invention is adapted to be embodied in a method of controlling a high pressure fuel injection system for a diesel internal combustion engine that comprises an accumulator type fuel injector, pressure control means for controlling the pressure of fuel supplied to the fuel injector and duration control means for controlling the timing of the discharge of the injector. Means are provided for sensing engine speed and also for sensing when an idle condition is called for by the engine. In accordance with this feature of the invention, a predetermined idle speed is maintained by holding one of the pressure control means and the duration control means constant and varying the other of the control means.

DETAILED DESCRIPTION OF THE PREFERRED EMBODIMENT OF THE INVENTION

Figures 1, 2:
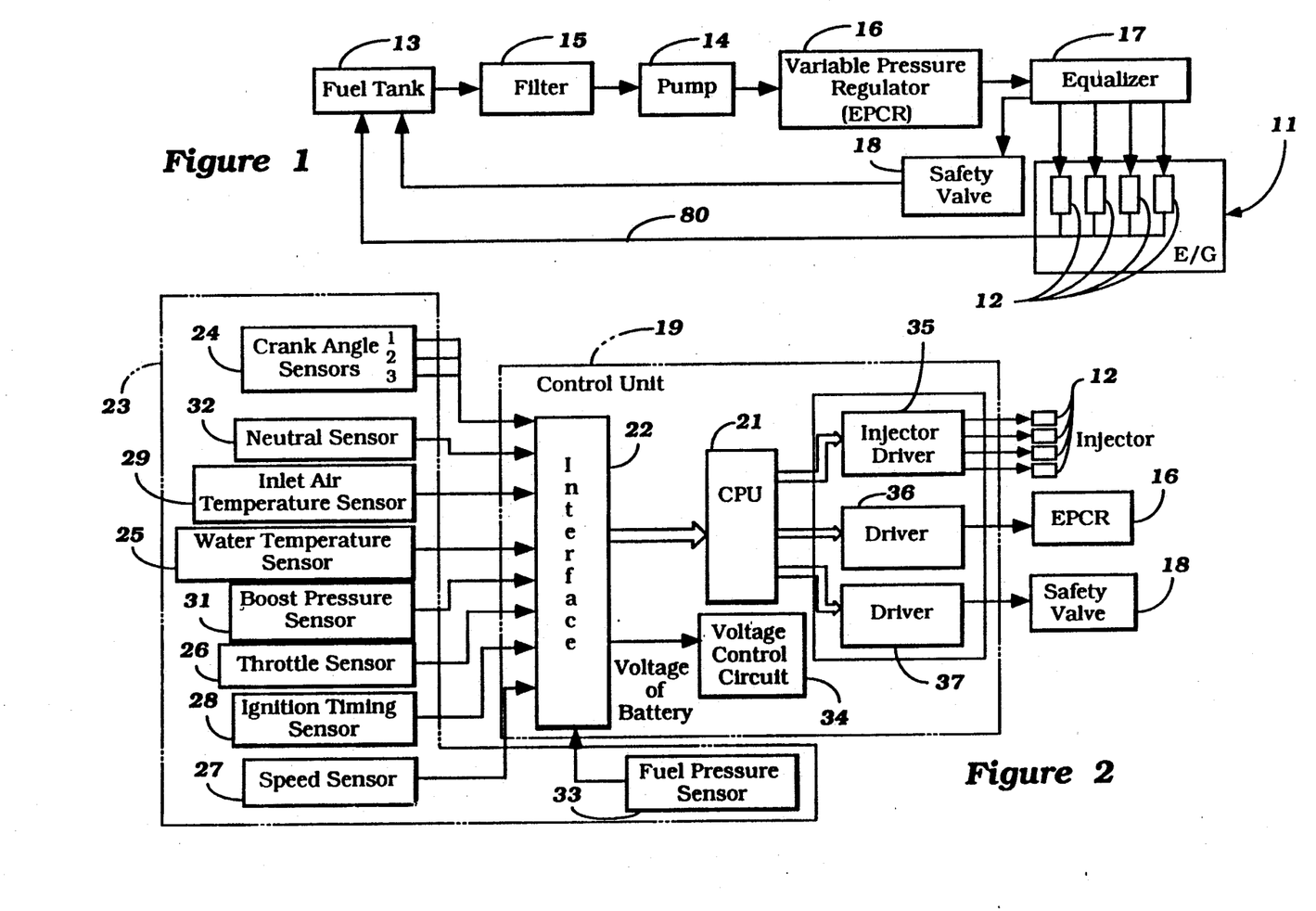
FIG. 1 is a schematic view showing the fuel injection system of an internal combustion engine constructed and operated in accordance with an embodiment of the invention.
FIG. 2 is a schematic view showing the control system for the fuel injection system.

Referring now in detail to the drawings and first to FIG. 1, a fuel injection system for a an internal combustion engine is shown in schematic fashion. In the illustrated embodiment, the injection system is employed in conjunction with a four cylinder two-stroke crankcase compression engine operating on the diesel cycle and having direct high pressure injection. It is to be understood, however, that the invention may be employed with engines having other numbers of cylinders, rotary engines, and engines operating on other than two stroke principles, such as engines running on the four-stroke principle. Certain facets of the invention may also be employed with spark ignited engines but the invention has particular utility in conjunction with engines operating on the diesel cycle. It is believed that the following description of the preferred embodiment of the invention will enable those skilled in the art to understand how the invention can be employed with various types of internal combustion engines.

Figure 3:
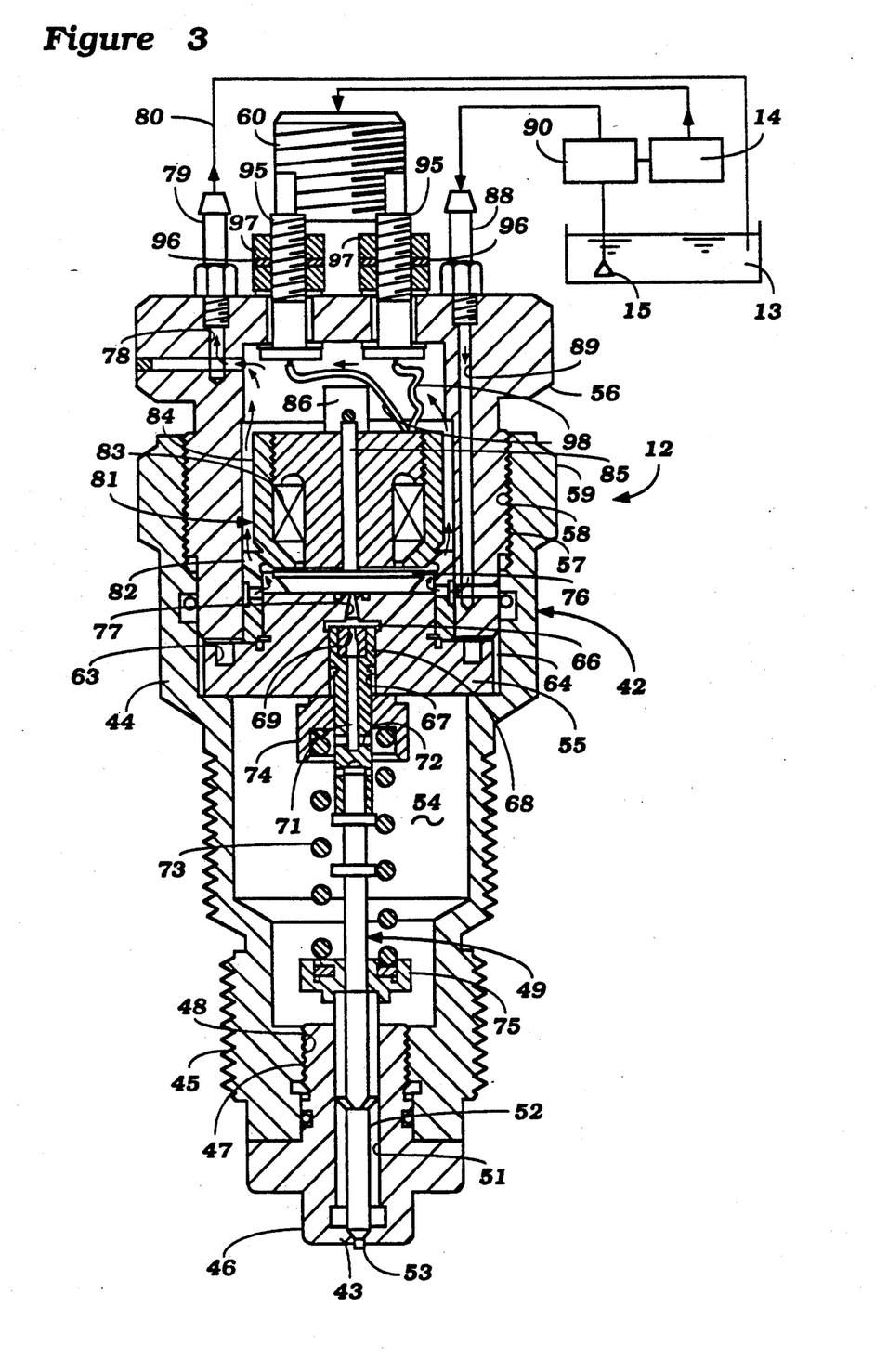
FIG. 3 is an enlarged cross sectional view taken through one of the fuel injectors of the system.
Figure 4:
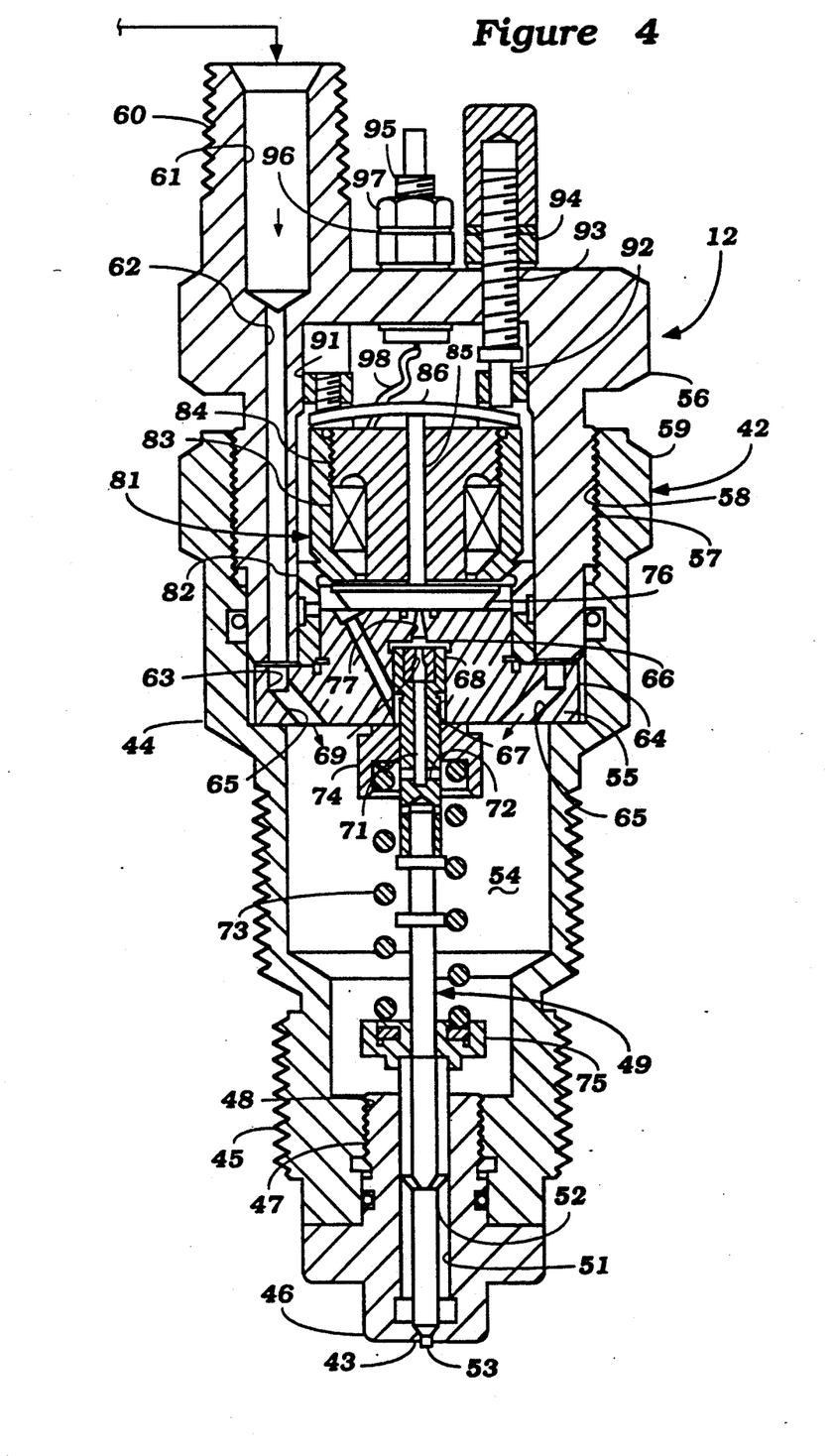
FIG. 4 is a cross sectional view of the fuel injector taken at 90° from FIG. 3.

The engine is illustrated schematically in FIG. 1 by the block 11 and includes four high pressure accumulator type fuel injectors, each indicated by the reference numeral 12 and which will be described in more detail by reference to FIGS. 3 and 4.

A fuel supply system is provided for supplying fuel to the injectors 12 from a fuel tank 13. This system includes a pump 14 which draws fuel from the tank 13 through a filter 15 and delivers it to a variable pressure regulator 16. The pressure regulator 16 then delivers fuel to a pressure equalizer 17 and manifold system for delivery to the individual fuel injectors 12. A safety valve 18 is provided in the equalizer 17 for returning fuel back to the tank 13 in the event of some malfunction of the system or in the event of excessively high fuel pressure.

Figure 7:
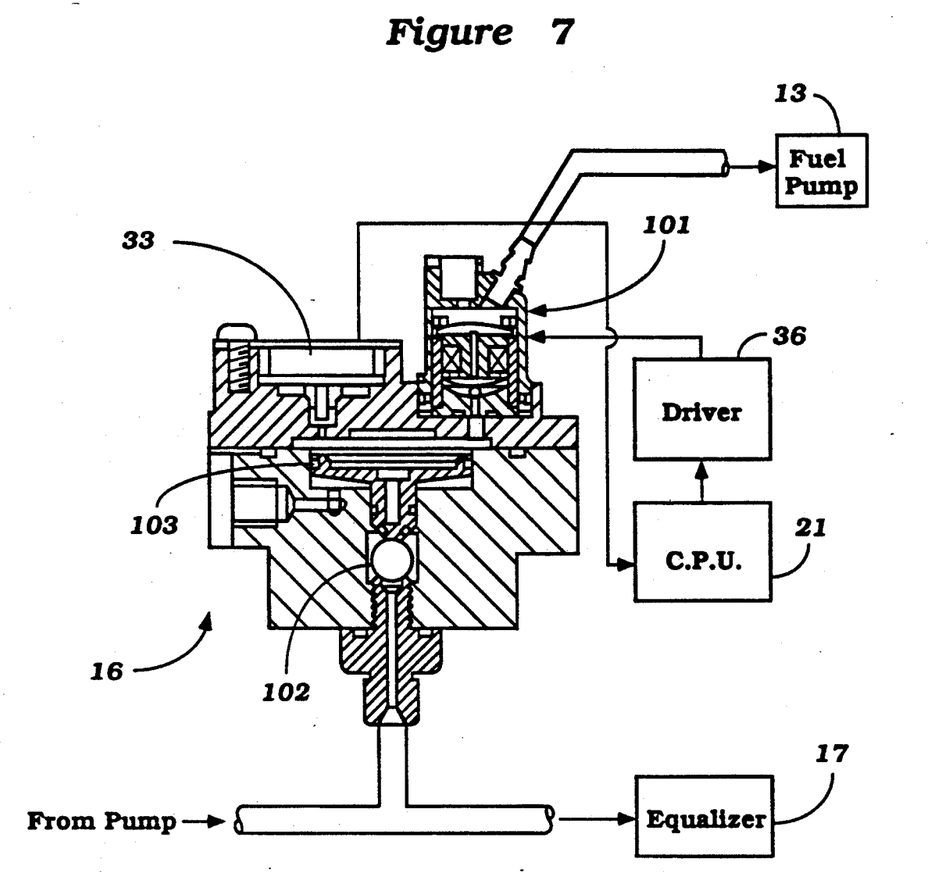
FIG. 7 is a partially schematic cross sectional view showing a fuel pressure regulator that may be employed in conjunction with the invention.

The variable pressure regulator 16 may have a construction as shown in FIG. 7 and is a pressure regulator that is capable of being controlled to vary the regulated pressure and which fuel is delivered to the equalizer 17, for a reason which will become apparent.

The control for the fuel injectors 12 is shown schematically in FIG. 2 and includes a control unit, which is indicated generally by the broken line 19 and which includes, as a major element, a CPU 21. The CPU 21 receives input signals from a plurality of sensors, to be described, by an interface 22 of the control unit 19. The sensors, indicated within a sensor block, indicated at 23, provide signals indicative of a wide variety of engine operating conditions, ambient conditions and vehicle conditions. In this regard, it is to be understood that in the preferred embodiment the engine 11 is employed for powering a motor vehicle. Of course, the invention can be employed in any of a wide variety of applications for internal combustion engines. The sensors, in the illustrated embodiment comprise crank angle sensors 24 that sense the rotational position of the crankshaft for each or selected numbers of its cylinders, an engine temperature sensor, in this case a water temperature sensor 25 that senses the water temperature of the liquid cooling system of the engine, a throttle position sensor 26, and an engine speed sensor 27. An ignition timing sensor 28 provides an output signal to the CPU 21 through the control phase 22 that is indicative of the specific engine timing chosen by the engine management system for the particular sensed condition.

An inlet air temperature 29 provides a signal indicative of the temperature of the air in the induction system. Alternatively or in addition, ambient air temperature sensors may also be provided.

In the illustrated embodiment, the engine 11 is of the turbo-charged type and, therefore, there is also provided a boost pressure sensor 31 that provides the CPU 21 with a signal indicative of the boost pressure of the charge being supplied to the engine.

As has been noted, there may be various vehicle condition sensors employed and, in the illustrated embodiment, there is provided a neutral sensor 32 which senses when the transmission of the associated vehicle is in its neutral condition. There may also be provided other vehicle condition sensors such as a sensor which may indicate when the clutch of the vehicle has been disengaged.

A fuel pressure sensor, indicated by the reference numeral 33 is provided for sensing the fuel pressure. This sensed fuel pressure may be pressure either upstream of the pump 14 and downstream of the pressure regulator 16. More preferably, however, the pressure sensor 33 senses pressure either at the equalizer 17 or the output pressure of the variable pressure regulator 16.

The interface 22 receives power from a battery (not shown) and this power source includes a voltage control circuit 34 that provides a constant voltage to the various items of the system. This constant voltage is supplied to the voltage control circuit 34 from the interface 32.

The CPU 21 is programmed, in a manner which will be described, so as to control the timing and duration of operation of the injectors and for this reason, outputs a signal to an injection driver circuit 35 which controls the fuel injectors 12, in a manner which will be described by particular reference to FIGS. 3 and 4. In addition, the CPU 21 outputs a control signal to a driver 36 which sets the variable pressure regulator 16 so as to determine the pressure of fuel supplied to the individual injectors 12. By combining the pressure control and injection timing and duration control, it is possible to control the speed of the engine and to maintain the desired idle speed while controlling the fuel economy, fuel emissions and other running characteristics, as will be described later.

The CPU 21 also outputs a signal to a driver circuit 37 that operates the safety valve 18 so as to dump the pressure in the system or, alternatively, return it to a safe value in the event an abnormal condition is sensed.

The description of the components as thus far made has been in block form because it is believed that those skilled in the art can readily select components that are well known in the art for effecting the control of the injections 12 in accordance with the control routine which will be described. For that reason, further detailed description of the components of the system is not believed to be necessary to understand and practice the invention.

The construction of a typical type of fuel injector which may be employed to practice the invention will now be described by particular reference to FIGS. 3 and 4 wherein one of the injectors 12 is shown in cross sectional views. Each injection nozzle 12 is comprised of an outer housing assembly, indicated generally by the reference numeral 42 that is adapted to be mounted, in a manner to be described, in the cylinder head of the internal combustion engine with a delivery port 43 communicating with the combustion chamber for delivering fuel to it in a manner to be described. Rather than direct cylinder injection, the invention may be utilized in conjunction with manifold injection systems but the inventions has particular utility with direct injection, for example as used with high speed diesel engines.

The outer housing 42 is comprised of a lower piece 44 that has a threaded lower end 45 that is adapted to be threaded into a suitable aperture in the cylinder head of the associated engine 11 in a known manner. The delivery port 43 is defined by a tip 46 that has a threaded portion 47 that is received in a threaded bore 48 formed at the lower end of the housing piece 44.

An injection valve 49 is slidably supported within a bore 51 of the nozzle piece 46 and has a reduced diameter portion 52 and a flow controlling tip 53 which, in the closed position, closes the delivery port 43. The valve portion 52 has interrupted enlargements for slidably supporting the injection valve 49 in the bore 51 in a known manner.

An accumulator chamber 54 is formed above the bore 51 by the housing piece 44. The accumulator chamber 54 is closed at its upper end by means of a closure plate 55 that is held against a shoulder in the housing piece 44 by a second housing piece 56. The housing piece 56 has a threaded portion 57 that is received within a threaded bore 58 of the housing piece 44 so as to hold the closure plate 55 in position and maintain the chamber 54 in a sealed condition, except as is hereinafter noted. Externally of the threaded opening 58, the housing piece 44 is formed with a hexagonal portion 59 so as to facilitate its insertion into the threaded bore of the cylinder head.

The housing piece 56 is formed with an inlet conduit 61 that has a threaded external portion 60 so as to receive a fitting for connecting a supply line extending from the equalizer 17 (not shown in FIGS. 3 and 4) to the inlet conduit 61.

The inlet conduit 61 (FIG. 4) which is generally a drilled opening, is intersected by a further drilled passageway 62 that extends axially along the housing piece 56 at one side thereof and which communicates at its lower end with a corresponding circumferential groove 63 formed in the upper face of a cylindrical portion 64 of the closure plate 55. The groove 62 is intersected by a plurality of bores 65 which extend into the accumulator chamber 54 for delivering fuel under pressure to the accumulator chamber 54.

A control chamber 66 is formed in the closure plate 55 by means of a bore 67 that opens through the lower end of the closure plate 55. The injection valve 49 has a generally cylindrical actuator portion 68 that is slidably supported within the bore 67 and which closes the lower end of the control chamber 66. A restricted orifice 69 fixed n the end of the actuator portion 68 communicates an axial passage 71 of the portion 68 and radial ports 72 with the accumulator chamber 54. The control chamber 66 communicates with the orifice 69 to receive the pressurized fuel and normally urge the injection valve 49 toward its downward or closed position.

A coil compression spring 73 encircles the injection valve 49 and bears against a retainer plate 74 at its upper end. The lower end of the spring 73 engages a cup shaped retainer 75 that is held axially in position against a shoulder formed by an enlargement on the injection valve 49 so as to further assist in maintaining the injection valve 49 in the closed position as shown in the drawings.

A control valve 76 is supported within the upper end of the closure plate 55 and controls the opening of a control valve port 77 formed in the upper end of the closure plate 55 and communicating with the control chamber 43. The control valve 76 comprises a headed portion that also acts as an armature plate. The control valve 76 is biased toward its closed position with the control valve port 77 in a manner to be described.

The control valve 76 when opened will permit the fuel in the control chamber 66 to return to the tank 13 through a return passageway 78 that extends axially through the end of the housing piece 56 parallel to the inlet passageway 62. The return passageway 78 communicates with a return conduit 80 through a fitting 79. Fuel can flow from the control valve port 77 to the return passageway 78 through suitable internal passageways or clearances to permit this return flow, which is relatively small in volume.

The control valve 76 is opened and closed so as to control discharge of fuel for the delivery port 43 by means of an electromagnetic assembly, indicated generally by the reference numeral 81. This electromagnetic assembly 81 includes a generally cylindrical yoke 82 that has an opening at an enlarged diameter lower end portion which is received on a cylindrical portion of the closure plate 55 so as to secure the electromagnetic assembly 81 in position.

The electromagnetic assembly 81 is comprised of a solenoid coil or winding 83 that is disposed at the lower end of a housing or yoke 84 which encircles an armature and is integrally formed with the yoke 82. The armature is formed with a bore that slidably supports a plunger 85 of the control valve 76. A leaf type spring 86 is carried by the yoke 84 and bears against the upper end of the plunger 85 for urging the control valve 76 to its closed position.

It should be noted that the yoke 84 has a smaller diameter than the corresponding bore 87 of the housing piece 56 so as to define a clearance therebetween which acts as a cooling jacket around the solenoid winding 83.

Fuel is circulated through this cooling jacket from the low pressure feed pump 90 (not shown in FIG. 1) through a conduit. The conduit communicates with a fitting 88 affixed to the housing piece 56 and communicates with a conduit 89 formed therein for delivering fuel to this cooling jacket. The fuel thus circulated is returned through the passage 78 and fitting 79 which, as has been noted, also returns the fuel that is dumped from the control chamber 66 when the control valve 76 is opened.

The tension of the spring 86 is adjusted by means of a fixed stop pin 91 that engages one end of the leaf spring 86 and an adjustable stop 92 that engages the other end. The adjustable stop 92 has a threaded portion 93 that is threaded into a lock nut assembly 94 for adjusting the preload on the spring 86.

The circuit for energizing the coil 83 of the electromagnet assembly 81 for opening the control valve 76 includes a pair of terminal posts 95 that extend through the upper end of the housing piece 56 with electrical tab connectors 96 which are held on the posts 95 in electrical contact with them between a respective pair of nuts 97 so as to afford attachment to an appropriate lead of a circuit with the driver 36. Wires 98 are connected to the posts 91 to complete the connection to the winding 83.

The condition shown in the figures is that which occurs when the winding 83 is deenergized. When the winding 83 is deenergized, the control valve 76 will be held in its closed position by the spring 86 so that the accumulator chamber 54 and control chamber 66 may be pressurized.

At the appropriate instant for fuel injection to begin, which may be controlled by the strategy to be described, the winding 83 is energized. When this happens, the relief valve armature 76 will be attracted upwardly by the flux in the armature of the solenoid 81 so as to urge the valve portion 85 upwardly and open the control valve 76 against the action of the spring 86. The pressure in the control chamber 66 will then be rapidly depleted and the higher pressure of the fuel acting in the accumulator chamber 54 will urge the injection valve 49 upwardly and permit fuel to issue from the discharge port 43. When the fuel pressure in the accumulator chamber 54 has been depleted, the spring 73 will move the injection valve 49 to its closed position and the fuel pressure can then build up in the accumulator chamber 54. This action is initiated by discontinuing the energization of the winding 83 so as to close the control valve 76 and permit pressure in the control chamber 66 to again build up.

The control strategy for operating the injectors 12 will now be described by particular reference to FIG. 5 and 6. It should be noted that the described control strategy deals with the control of the fuel injectors 12 to maintain idle speed under varying conditions. The strategy of fuel control for other than idle conditions may be of any known type.

As has been previously noted, conventional diesel engines have their fuel injection at idle occur for a relatively short duration, such as approximately 10° of crank angle. In order to provide good operation, this fuel is injected quite early before the combustion cycle, and accordingly, there is a high likelihood of knocking occurring. By employing an accumulator type of fuel injection system, it is possible to inject fuel during a longer period of time at idle speed. Because of this longer duration, then it is possible to tailor the injection performance at idle so as to achieve optimum conditions as may be desired. For example, in one control strategy, to be described first, the quantity of fuel delivered to maintain idle speed is varied while injection time is held constant. With such an arrangement, it is possible to provide lower combustion temperatures, less $NO_x$ and, lower combustion pressure, lower combustion noise and idle speed. With another type of injection strategy, to be described, it is possible to promote improved combustion efficiency, less fuel consumption and improve cold starting.

Figure 5:
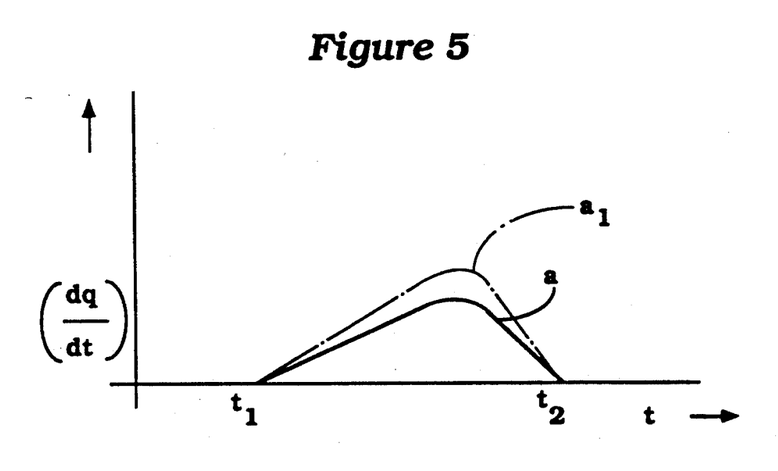
FIG. 5 is a graphical view showing one of the control strategies for maintaining idle condition.
Figure 6:
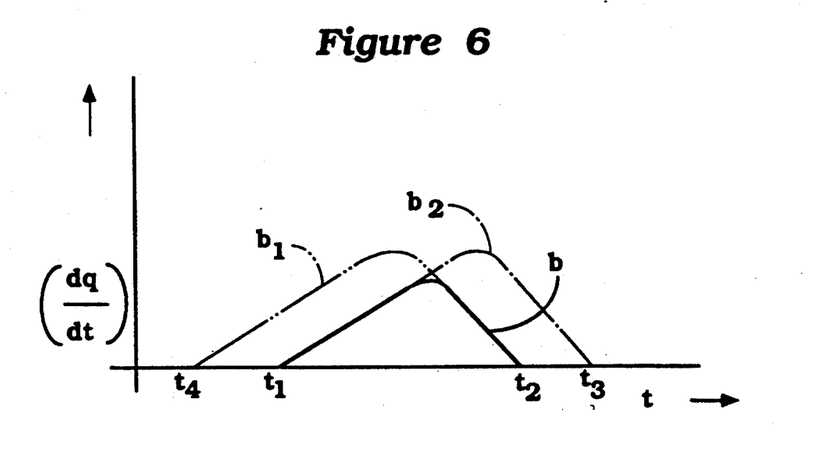
FIG. 6 is a graphical view showing another of the control strategies for maintaining idle condition.

FIGS. 5 and 6 show the quantity of fuel delivered by the injectors 12 in response to time t. The graphs of FIGS. 5 and 6 show the instantaneous rate of change of fuel supply dq with respect to a change in time dt. The curve of FIG. 5 is the first embodiment of control strategy in order to maintain idle speed as above noted. A normal control curve is indicated by the solid line curve a. With this curve, it will be noted that the duration of the injection timing is held constant, beginning at the time $t_1$ and completing at the $t_2$. In accordance with this control strategy, idle speed is maintained by varying the fuel pressure that is supplied to the injectors 12, this being done by varying the pressure supplied by the variable pressure regulator 16. If idle speed is too low, further fuel is supplied by increasing the amount of fuel pressure to follow the curve $a_1$. It will be seen that the curve $a_1$ supplies a greater amount of fuel by increasing the pressure but does not change the duration of time of fuel injection. That is, the injection is begun at the point $t_1$ and is again completed at the point $t_2$. With this control strategy, the timing of the opening of the injector valve 53 is set for its maximum permissible time under idle. If idle speed is to be reduced to maintain the predetermined idle speed, the pressure is lowered while the time is again maintained constant.

Although any type of variable pressure regulator may be employed for controlling the fuel pressure, FIG. 7 shows a type of pressure regulator that can be employed in conjunction with the invention. The regulator 16 is, in the illustrated embodiment, of the pilot operated type and includes a pilot control valve 101 that is electrically operated and which is controlled by the driver 36 under the control of the CPU 21, as aforenoted. In this embodiment, the fuel pressure sensor 33 is positioned directly in the regulator 16 and outputs its signal, asaforenoted, to the CPU. A main regulator control valve 102 is operated by a regulator piston 103 for maintaining the fuel pressure at that set by the CPU 21 in a well known manner.

It should be noted that the condition of idle is determined when the throttle sensor 26 indicates that the throttle valve or accelerator pedal is in its idle condition.

The control strategy just described results in lower combustion temperature, less $NO_x$, lower combustion pressure, lower combustion noise and stabilized idle speed.

The other described control strategy, which may be employed is shown in FIG. 6. In accordance with this strategy, the fuel pressure is maintained constant at the highest possible idle condition and idle speed is maintained by varying the duration of fuel injection. Also, the timing of the fuel injection may be varied. The solid line curve b shows the normal idle curve. If, however, idle speed is too low, then the amount of fuel is varied by changing the duration of injection with the curve $b_1$ showing an arrangement wherein this is done by advancing the start of injection $t_1$ to the point $t_4$ and maintaining the closing from the point $t_2$. By doing this, improved combustion efficiency, less fuel consumption and improved cold starting is obtained. Therefore, the curve $b_1$ is chosen if these conditions are to be optimized.

The injection duration may also be increased by using a curve such as the curve $b_2$ wherein injection is started at the normal time $t_1$ but closing is retarded to the time $t_3$. This type of injection curve is advantageous when it is determined that a knocking or combustion noise condition exists and to prevent that.

It should be readily apparent from the described construction that the methods of maintaining the desired idle speed are very effective in achieving this result and also tailoring the idle performance to the desired running condition, such as cold starting, when knocking may be encountered or the like.

Of course, the foregoing description is that of a preferred embodiment of the invention and various changes and modifications may be made without departing from the spirit and scope of the invention as defined by the appended claims.

I claim:

1. A high pressure fuel injection system for a diesel type internal combustion engine comprising an accumulator type fuel injector for spraying a quantity of fuel stored in the accumulator into said engine, pressure control means for controlling the pressure of the fuel supplied to said fuel injector, duration control means for controlling the timing of the discharge of said injector, means for sensing engine speed, means for sensing when an idle condition of the engine is called for by the engine, and means for maintaining a predetermined idle speed by holding one of the pressure control means and duration control means constant and varying the other of the control means.

2. A high pressure fuel injection system for a diesel engine as set forth in claim 1 wherein the pressure control means is varied to maintain the idle speed.

3. A high pressure fuel injection system for a diesel engine as set forth in claim 2 wherein the time of duration of the injection is held constant at its maximum permissible value for the idle condition.

4. A high pressure fuel injection system for a diesel engine as set forth in claim 1 wherein the pressure control means is held constant and the duration control means is varied.

5. A high pressure fuel injection system for a diesel engine as set forth in claim 4 wherein the time of duration of injection of fuel is varied.

6. A high pressure fuel injection system for a diesel engine as set forth in claim 4 wherein the start of injection is varied.

7. A high pressure fuel injection system for a diesel engine as set forth in claim 4 wherein the end of injection is varied.

8. A method of operating a high pressure fuel injection system for a diesel engine comprising an accumulator type fuel injector for spraying a quantity of fuel stored in the accumulator into said engine, pressure control means for controlling the pressure of the fuel supplied to the fuel injector, duration control means for controlling the timing of the discharge of the injector, means for sensing engine speed, means for sensing when an idle condition of the engine is called for by the engine comprising steps of maintaining a predetermined idle speed by holding one of the pressure control means and duration control means constant and varying the other of the control means.

9. A method as set forth in claim 8 wherein the pressure control means is varied to maintain the idle speed.

10. A method as set forth in claim 9 wherein the time of duration of the injection is held constant at its maximum permissible value for the idle condition.

11. A method as set forth in claim 8 wherein the pressure control means is held constant and the duration control means is varied.

12. A method as set forth in claim 11 wherein the time of duration of injection of fuel is varied.

13. A method as set forth in claim 11 wherein the start of injection is varied.

14. A method as set forth in claim 11 wherein the end of injection is varied.

* * * * *